Figure 1A:
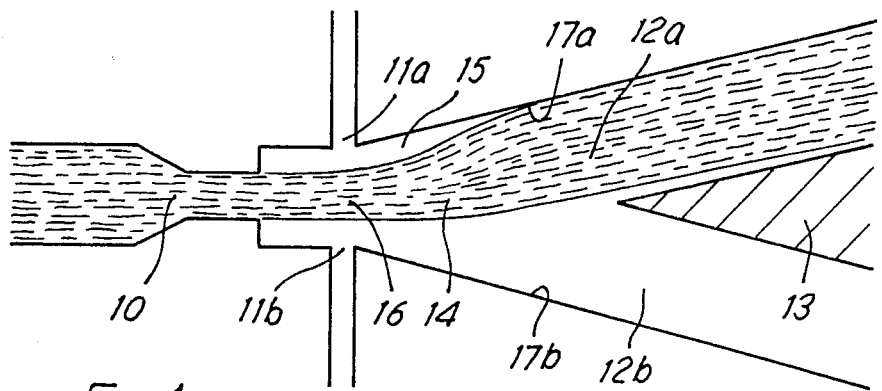

United States Patent [19]

Markland et al.

[11] Patent Number: 4,838,091
[45] Date of Patent: Jun. 13, 1989

[54] FLUDIC OSCILLATOR FLOWMETERS

[75] Inventors: Eric Markland, Penylan, Wales; Graham M. Tofield, Wincham, England; Gary P. Lucas, Bolton, England; Hardyal S. Kalsi, Sale, England

[73] Assignee: Thorn EMI Flow Measurement Limited, Stretford, England

[21] Appl. No.: 66,426

[22] Filed: Jun. 26, 1987

[30] Foreign Application Priority Data

Jun. 27, 1986 [GB] United Kingdom ............... 8615702

[51] Int. Cl.⁴ .................................................. G01F 1/20
[52] U.S. Cl. .................................... 73/861.19; 137/835
[58] Field of Search ................. 73/861.19; 137/804, 137/834, 835

[56] References Cited

U.S. PATENT DOCUMENTS

| 3,504,691 | 4/1970 | Campagnuolo et al. |
| 3,690,171 | 9/1972 | Tippetts et al. |
| 4,550,614 | 11/1985 | Herzl ............................ 73/861.19 |

FOREIGN PATENT DOCUMENTS

| 0041315 | 3/1983 | Japan .......................... 73/861.19 |
| 1081421 | 3/1984 | U.S.S.R. ...................... 73/861.19 |
| 1101599 | 7/1984 | U.S.S.R. ...................... 73/861.19 |
| 1155789 | 5/1985 | U.S.S.R. ...................... 73/861.19 |
| 1091899 | 11/1967 | United Kingdom . |
| 1178048 | 1/1970 | United Kingdom . |
| 1363762 | 8/1974 | United Kingdom . |
| 1400831 | 7/1975 | United Kingdom . |
| 1453587 | 10/1976 | United Kingdom . |
| 2177204 | 1/1987 | United Kingdom . |

OTHER PUBLICATIONS

"Fluidic Oscillators", by C. J. Campagnuolo et al. Instruments and Control Systems, Jun. 1970, pp. 99–103.
"Experimental Investigation of a Fluidic Volume Flowmeter", by M. P. Wilson et al., Transactions of the ASME, Nov. 1969, pp. 1–4.
"Development of a Wall-Attachment Fluidic Oscillator Applied to Volume Flow Metering", by R. B. Beale et al., Hydrodynamic Oscillators, pp. 989–996.
"Fluidic Devices", E. F. Humphrey et al., Fluidics, 1965, pp. 8–18.
"Experimental and Theoretical Investigation of a Fluidic Volume Flow Meter", by M. P. Wilson, Jr. Transactions of the ASME, Jour. of Basic Engineering.
"The Effect of Geometric Changes Upon the Switching Point in a Model Bi-stable Fluid Amplifier", by H. F. Hrubecky et al., Proc. Fluid Amplification Symposium, May 1964, pp. 341–350.
"The Response of a Bi-stable Fluid Amplifier to a Step Input", by S. Katz et al., Fluid Amplification Symposium, May 1964, pp. 321–339.
"A Unified Approach to Hydrodynamic Oscillator Type Flowmeters", by H. Yamasaki et al., pp. 191–198.

*Primary Examiner*—Herbert Goldstein
*Attorney, Agent, or Firm*—Fleit, Jacobson, Cohn, Price, Holman & Stern

[57] ABSTRACT

A fluidic-oscillator type flowmeter has an inlet nozzle (1) leading into a chamber (2) with diverging side walls (3a, 3b). A splitter (8) has a blunt end opposite the inlet nozzle and defines outlet paths (4a, 4b) which lead from the chamber. The shape and position of the splitter are such that oscillating flow is encouraged across its face. Feedback channels (5a, 5b) lead from the side walls back to control ports (7a, 7b) which open into the chamber. The relative position of the splitter and feedback channel entrances is such that the downstream corners of the entrances to the feedback channels lie in the oscillating path of the edge of the flow which separates from the face of the splitter when the meter is in use.

23 Claims, 4 Drawing Sheets

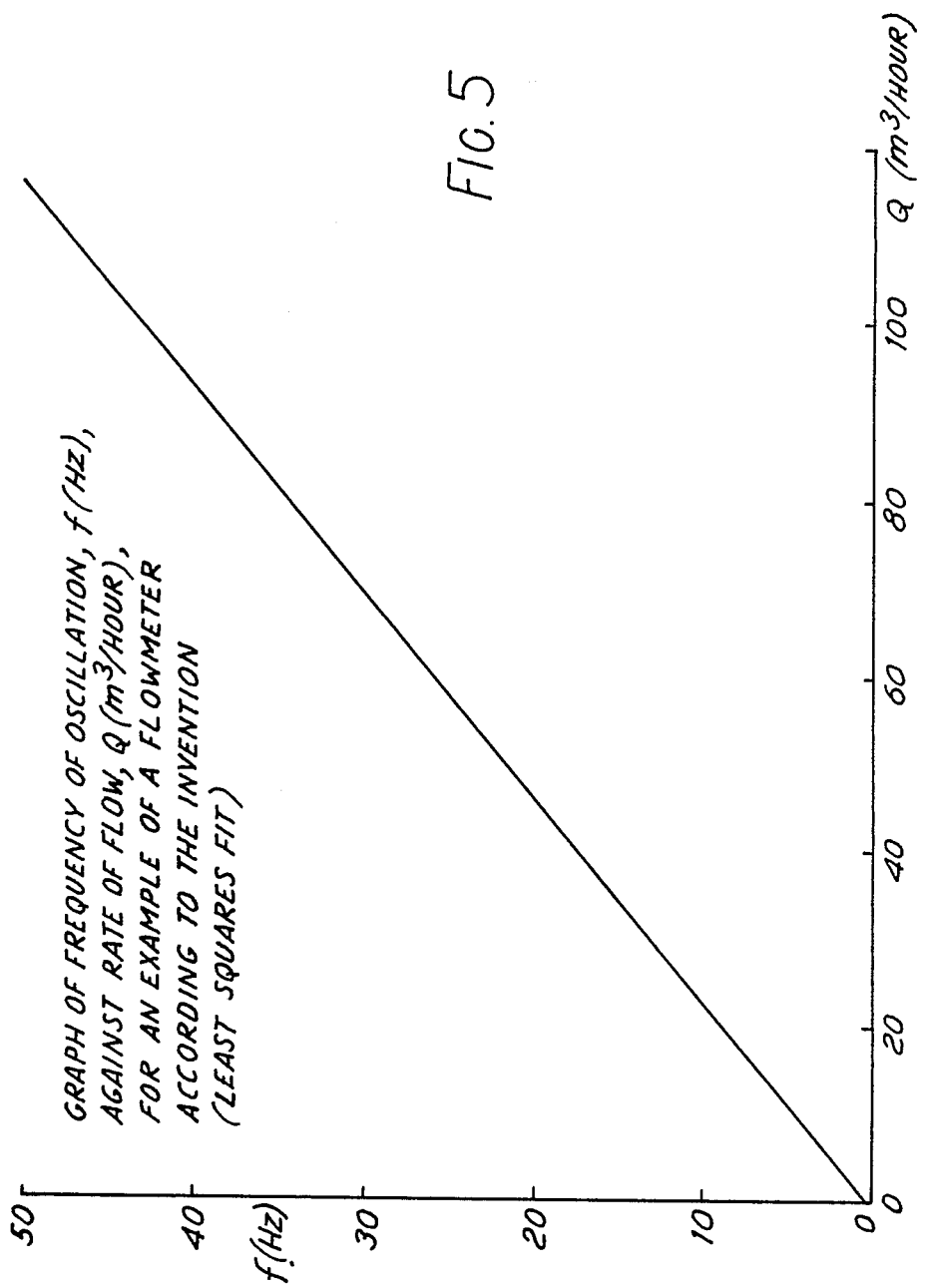

FLUDIC OSCILLATOR FLOWMETERS

This invention is related to fluidic oscillator-type flowmeters which are non moving part (NMP) meters.

Flowmeters based on the fluidic oscillator principle are known. Wall-attachment fluidic amplifiers basically consist of a bistable element such as that represented in FIGS. 1A and 1B.

Figure 1B:
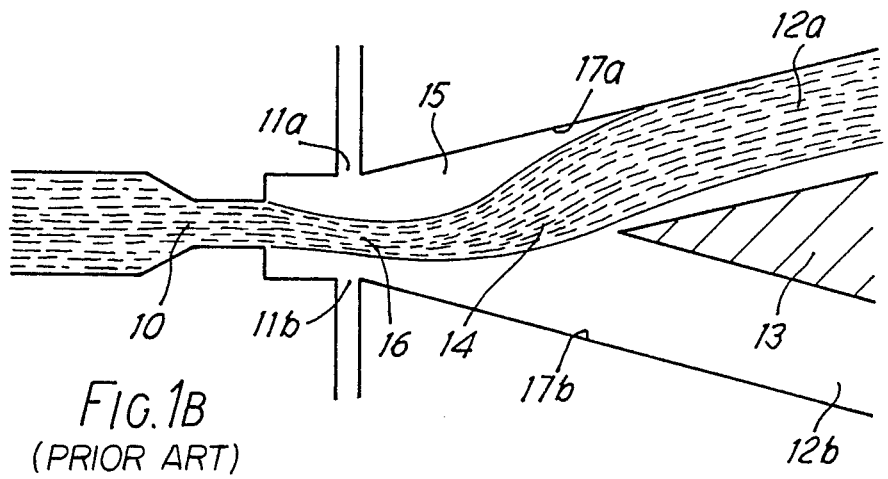

Referring to FIGS. 1A and 1B, inlet nozzle 10 opens into interaction chamber 16 which has side walls 17a and 17b and receiver arms 12a and 12b leading from it, which are divided by a splitter 13. Control ports 11a and 11b lead into the interaction chamber. The shaded region 14 represents the jet, which in FIG. 1A is attached to the side wall 17a. The region 15 is known as a "separation bubble", in which there is recirculating flow, driven by the motion of the jet. The pressure within the separation bubble is lower than the pressure on the opposite side of the jet, so the jet experiences a lateral force due to the pressure difference across it. It is this lateral force which causes curvature of the jet and attachment to the side wall. In the absence of any additional fluid injected into the separation bubble through control port 11a, the jet will remain indefinitely attached to the side wall 17a. If, however, additional fluid is injected into the separation bubble through control port 11a, the pressure in the bubble rises. The lateral force on the jet is reduced, the curvature is therefore reduced, and the separation bubble lengthens. If the rate of injection is sufficient, the bubble bursts and the jet detaches from the wall. The pressure difference across the jet is reversed, and the jet attaches to the opposite wall 17b. To provide a fluidic oscillator, feedback passages are usually provided from the side walls to supply the necessary fluid to the control ports since part of the fluid from the jet then flows into the feedback passage while the rest flows into the receiver arm. The fluid from the feedback passage thus increases and the pressure in the bubble causes the jet eventually to flip over and become attached to wall 17b. The process then continues in reverse and the jet oscillates.

In known flowmeters, oscillation is produced by intermittent flows in the feedback channels which cause the jet to move in an oscillatory manner between the attachment walls, thus sustaining the intermittent flow in the feedback channels. In some constructions a splitter is used to divide the outlet paths, and in other constructions a splitter is omitted. The two outlet paths normally lead to a single exit through which all of the fluid which enters at the inlet jet leaves.

In a suitably designed meter, the frequency of oscillation of the jet is proportional to the velocity of the inlet jet, and therefore to the volumetric flow rate, over a range of flow. In addition, if the amplitude of the oscillating signal is also detected then the density of the metered fluid can be derived. Knowledge of both the volumetric flow rate and the density of the metered fluid yields mass flow rate. The maximum flow rate through the meter is normally limited by the maximum permissible pressure drop across it (although other effects such as density change of a gas or cavitation of a liquid may also be limiting factors).

The minimum flow rate is determined by the lowest jet velocity at which oscillations occur or at which they can be detected.

We have found that the meter described in British Pat. No. 1,453,587 is less sensitive than is desirable. It is therefore an object of the invention to provide a meter with greater sensitivity.

The performance of the meter can be measured, as one criterion, by the turndown ratio which is defined as the ratio between the maximum and minimum flow rates detected by the flowmeter within the required accuracy constraints.

Since the maximum permissible pressure drop is usually subject to a strict limit chosen according to the application, the maximum flow rate through a meter of specified nozzle size is also strictly limited. To increase the turndown ratio it is therefore necessary to reduce the lowest flow rate at which oscillations may be detected. A further object of the invention is to provide a flowmeter which sustains oscillations that may be detected down to very low flow rates, thereby providing a large turndown ratio. This object should be achieved without making the meter sensitive to installation effects, preferably maintaining a closely linear dependence of frequency on flow rate, and without increasing the pressure drop across the meter.

The term "Reynolds number" is often used in describing fluid flow. The Reynolds number, usually abbreviated to "Re" is defined by the expression $Re = vb/\nu$ where, in this instance, v represents the velocity of fluid flow through the nozzle, b is the nozzle width and $\nu$ is the property of kinematic viscosity of the fluid. The Reynolds number provides a basis of comparison of results obtained using meters of different sizes and using fluids with different properties. For a given meter and a given fluid, the Reynolds number is proportional to the flow rate. Accordingly, an object of the invention is to provide a flowmeter which sustains oscillations that may be detected down to very low Reynolds numbers.

According to the invention there is provided a flowmeter of the fluidic oscillator type comprising an inlet nozzle (1) in communication with a chamber (2), said chamber having diverging side walls (3a, 3b), a splitter (8) having a face opposite said inlet nozzle, the splitter defining outlet paths (4a, 4b) leading from the chamber and being shaped and disposed to encourage, in use, the development of oscillating flow across said face, a feedback channel (5a, 5b) leading from each wall to a respective control port (7a, 7b) opening into the chamber, the relative position of the splitter and the entrances of the feedback channels being such that, in use, the downstream corners of the entrances to the feedback channels lie in the oscillating path of the edge of the flow which separates from the face of the splitter.

The splitter may be blunt-ended and should be of adequate width and have sufficiently sharp corners to promote deflection of the jet when it strikes the splitter, so encouraging oscillation.

The entrances to the feedback channels are positioned, on opposite sides of the splitter, to alternately receive impulses from the oscillating flow across the face of the splitter. This strengthens oscillation of the jet and maintains oscillation over a wider range of flow rate than is possible without the use of an alternating stream across the face of the splitter.

Resistance to flow in the outlet paths may be provided by restrictions downstream of the feedback channels, the restrictions being so proportioned to promote oscillation of the jet from side-to-side between the side walls. Obstructions or sharp bends may be used rather than restrictions.

The feedback channel entrances preferably lie, in part, upstream of said face of the splitter.

The entrances to the feedback channels are preferably inclined to the side walls at an angle greater than 90°.

Preferably each side wall has a first surface bounding said chamber and a second surface parallel to said first surface bounding the feedback channel. This configuration allows the feedback channels to be made short compared with prior arrangements and the walls may be of minimum thickness consistent with mechanical strength and stability.

Figure 2:
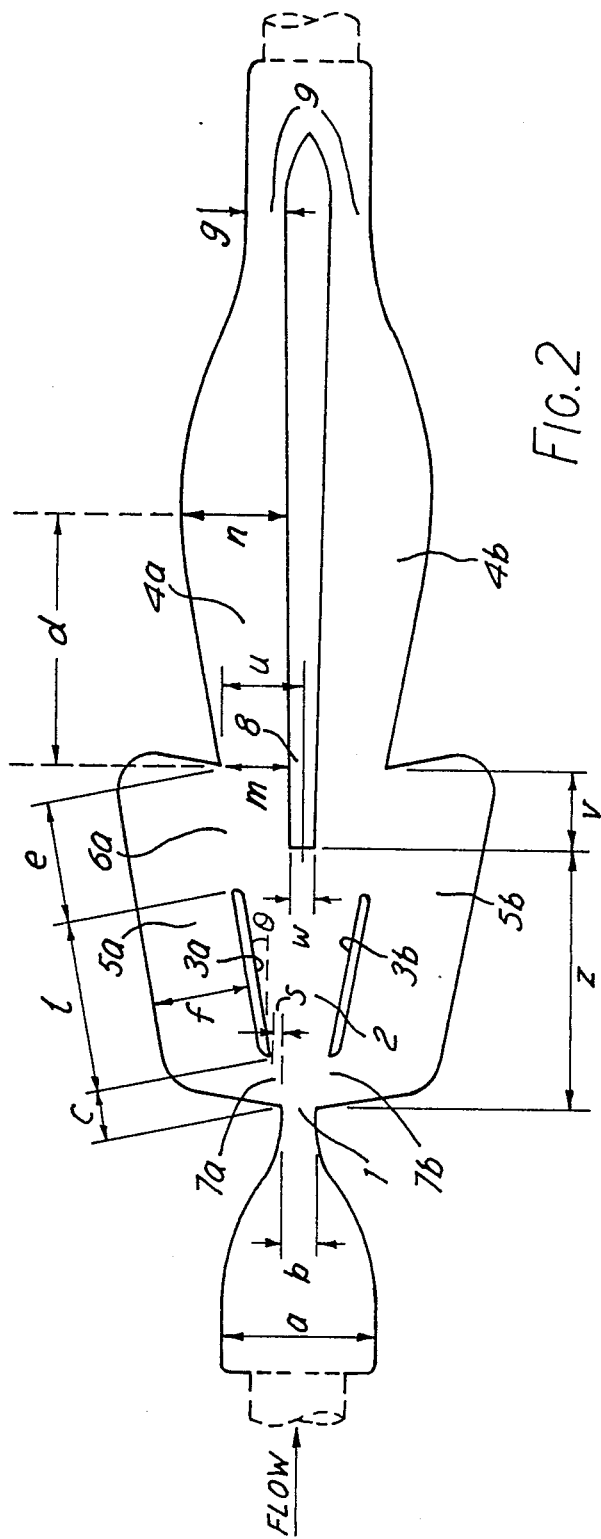
Figure 3A:
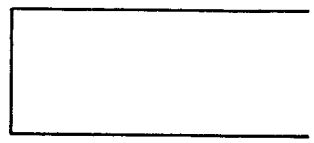
Figure 3B:
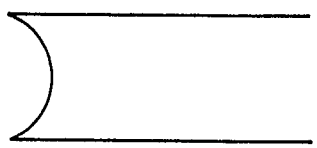
Figure 3C:
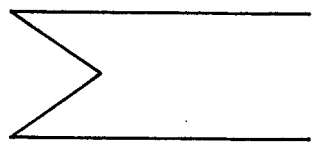
Figure 3D:
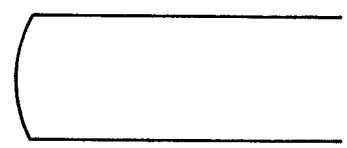
Figure 4A:
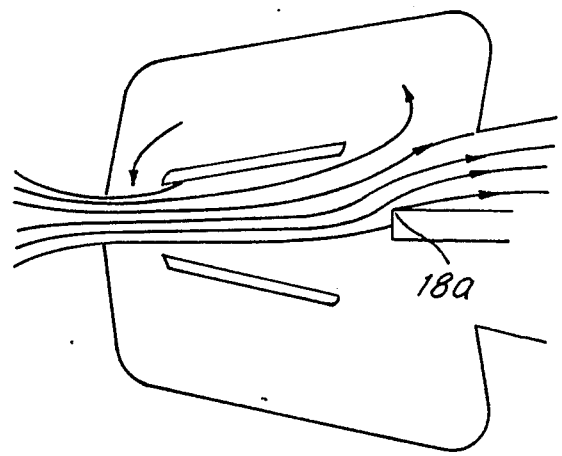
Figure 4B:
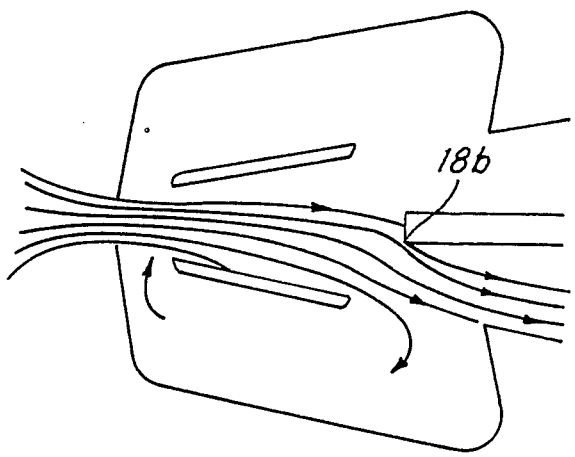

In order that the invention may be clearly understood and readily carried into effect, it will be described by way of example with reference to the accompanying drawings of which:

FIGS. 1A and 1B are schematic sectional plan views of a known fluidic amplifier as described earlier, FIG. 2 is a schematic sectional plan view of a flowmeter according to the present invention, FIGS. 3A, 3B, 3C and 3D are plan views of splitters suitable for use in the invention, FIGS. 4A and 4B show two typical instantaneous streamline patterns of the flow in a meter according to the invention, and FIG. 5 shows a graph of oscillation frequency against flow rate for an example of a flowmeter according to the invention.

Referring to FIG. 2, this shows a schematic sectional plan view of a non moving part flowmeter of the fluidic oscillator type, according to the present invention. Fluid inlet nozzle 1 enters chamber 2 which has attachment walls 3a and 3b. Outlet paths 4a and 4b lead from chamber 2 and are separated by splitter 8. Feedback channels 5a and 5b lead from the side walls to the control ports 7a and 7b respectively. Restrictions 9 are provided in the outlet paths or at their exits. Dimensions indicated are the inlet nozzle width b, the control port width c, the attachment wall length 1, the feedback channel entrance width e, the splitter width w, the nozzle to splitter distance z, the perpendicular distance u from the downstream corner of the of the feedback channel entrance to the centre line of the meter, the distance v from the downstream corner of the feedback channel to the front face of the splitter (taken parallel to the centre line of the meter), the restriction width g, the feedback passage width f, the width a of the channel upstream of the nozzle, the wall setback distance s, the angle $\theta$ of inclination of the side walls and the diffuser length d.

The method of operation of the present invention is similar to that described previously for the case in which feedback arms are provided between the diverging side walls and the control nozzles. Referring to FIG. 2 which relates to the present invention, fluid enters through inlet nozzle 1 and when the jet is curved towards wall 3a, inlet 6a of feedback channel 5a is at a higher pressure than outlet 7a. Fluid will also flow through constriction 9, so there will consequently be a build up of pressure at 9 which will be transmitted to inlet 6a.

The pressure difference across the inlet and outlet of the feedback channel will start to accelerate the fluid in the feedback channel so that it moves into the separation bubble. As the volume of the separation bubble increases, the attachment point of the jet on wall 3a moves downstream. The rate at which fluid moves into the separation bubble will exceed the rate at which fluid is entrained away, and the bubble therefore keeps growing until it reaches a point of instability and the main jet "flips" over to the opposite wall.

The splitter is essential to the present invention because it is desired to meter low flow rates. The inventors have found that it should be of a form such that an oscillating flow is developed across its face and it must be positioned in relation to the entrances of the feedback channels such that the channels receive impulses from this oscillating flow. In particular, the downstream corners of the entrances to the feedback channels must be correctly located in the path of the edge of the oscillating flow which separates from the nose of the splitter.

A suitable splitter is blunt-ended, for example square cut or bluff-ended, as shown in FIG. 3A, and it should have sharp corners, or at least corners with small radii of curvature. A cusp-shaped splitter with sharp corners, as shown in FIG. 3B, is also suitable as are other re-entrant shapes such as that shown in FIG. 3C. A slightly convex shape as shown in FIG. 3D would also be suitable and "blunt-ended" is intended to encompass these shapes, provided that it possesses sharp corners from which the flow separates. The edges of the splitter need not be parallel. The splitter should also be of adequate width. The ratio w/b should fall within the range 0.4 to 1.2 inclusive (preferred value 0.44).

FIGS. 4A and 4B show two typical instantaneous streamline patterns. As can be seen from these figures, the flow reverses across the face of the splitter as the main jet switches from one side to the other and separation of the flow from the corners 18a and 18b occurs. This is due to the inability of the fluid to negotiate the sharp bend.

The oscillations across the face of the splitter are accompanied by intermittent separation of flow from alternate corners 18a and 18b of the splitter as indicated in FIGS. 4A and 4B, so that the flow has the nature of a jet which is directed alternately to the two outlet channels. The alternating jet directs a portion of the flow into the entrance to the feedback channels and oscillations of the jet are maintained even for very low inlet jet velocities and therefore oscillations occur over a much wider range of flow than is possible without the use of alternating flow across the splitter.

In the present invention, the splitter is therefore a means for producing a dynamic effect which is exploited in the invention, as opposed to in a static device as described in British Pat. No. 1,453,587.

The inventors have found that movement of the splitter from its preferred position along the line of the inlet jet by a distance equal to the width of the inlet nozzle can raise the minimum detectable flow rate by a factor of 5, and therefore this reduces the effective range (turndown ratio) of the flowmeter by the same factor.

The splitter, and in particular the relative positioning of the splitter and feedback channel entrances, determines the amount of fluid which enters the feedback channels. If the splitter is placed too far from the inlet jet, the oscillating flow across the face of the splitter produces a major effect downstream of the entrances to the feedback channels and if it is placed too close to the inlet jet, the flow at the entrances to the feedback channels is unduly constrained and advantage cannot therefore be taken of the oscillating flow across the splitter.

The splitter also serves the function of dividing the two outlet paths ahead of the restrictions 9 and it should therefore extend over the length of the diffusing passages.

The restrictions may be, for example, of the form of sharp bends in the outlet paths rather than constrictions or obstructions, provided that they present an equivalent resistance to the flow. There is a maximum size of restriction above which oscillation of the jet ceases. Referring to FIG. 2, the ratio $g/b$ preferably falls within the range $0.5 \leq g/b \leq 1.5$. Values in the middle of this range are preferred, for example $g/b=1$, and $g/b=0.95$ is found to be particularly useful.

The positions of the downstream corners of the feedback channels in relation to the splitter are given by the ratios $u/w$ and $v/u$, which desirably fall within the ranges 2 to 8 inclusive and 0.4 to 1.3 inclusive respectively. $v/u$ is preferably within the range 0.7 to 1.3 inclusive. The preferred values for $u/w$ and $v/u$ are 4.71 and 1 respectively.

The preferred ranges (quoted in terms of the nozzle width b) for other dimensions shown in FIG. 2 are given in the following table:

| RANGE | PREFERRED VALUE |
|---|---|
| $5 \leq z/b \leq 9$ | 6.25 |
| $3 \leq 1/b \leq 6$ | 4.00 |
| $0.9 \leq f/b \leq 4$ | 2.50 |
| $0.7 \leq c/b \leq 2.5$ | 1.25 |
| $2 \leq e/b \leq 5$ | 3.13 |

$f/b$ preferably lies in the range 2 to 4 inclusive and $c/b$ preferably lies in the range 0.7 to 2 inclusive.

In the preferred construction, the entrances of the feedback channels lie in part upstream of the nose of the splitter.

The entrances to the feedback channels are preferably at an angle greater than 90° to the walls $3a$ and $3b$, i.e. the feedback channels are preferably inclined away from side walls $3a$ and $3b$.

The feedback channels are preferably of minimum length, which may be achieved by arranging them to run behind attachment walls of minimum thickness consistent with mechanical strength and stability, subject to $3 \leq 1/ \leq 6$ as in the table above.

The feedback channel entrances should be of a width such as to admit the pulses of fluid without allowing them to recirculate into the main fluid stream and the feedback channels should be sufficiently wide to transmit the pulses without undue loss. The control ports should be wide in relation to the inlet nozzle (with narrow ports the performance deteriorates considerably).

The wall angle $\theta$ of the meter is desirably in the range from 10° to 15° which has been used in previous fluidic devices. The preferred angle is 11°.

The angle of inclination of the control ports is preferably, as in normal practice, rather less than 90° measured from the initial line of motion of the jet (i.e. from the centre line of the meter).

The contraction ratio $a/b$ of the nozzle predominantly determines the pressure drop across the meter, and affects the uniformity of the velocity profile within the jet as it emerges from the nozzle. It is usually convenient to make the dimension a approximately equal to the diameter of the pipework in which it is installed, and it may suitably be between two and six nozzle widths, e.g. 4 nozzle widths.

The length and divergence of the diffusing passages (outlet paths) is determined by the amount of pressure recovery (conversion of kinetic to pressure energy) it is desired to achieve. A suitable angle for the outlet paths is 11° with the ratio of the greatest width n to the width m at the inlet approximately 2:1. These are typical values for a diffuser intended to gain a fair amount of pressure without too great a loss. It may however be possible to increase the angle without an excessive loss, or the smaller pressure rise that a smaller expansion ratio would achieve may be acceptable for certain applications. A shorter diffuser length d in relation to width of nozzle may therefore be possible with only a slight reduction in performance. A further consideration is that separation of flow from the walls of the diffuser would generate undesirable disturbances, thus making it more difficult to measure the oscillation of the jet.

The known design of fluidic oscillators should be taken into account when making a meter according to the invention and dimensions such as the setback distance s, diffuser length d and aspect ratio should be set within conventional ranges.

Typically the oscillating variation of pressure is measured using a commercial differential pressure transducer. Inlets to each diffuser arm on either side of the splitter may be connected via, for example, a diaphragm which oscillates as the jet switches from one side of the device to the other. This oscillation may be used to produce an electric signal and the flow can be measured since the volume of gas which has flowed through the fluidic oscillator is related to the number of pressure pulses. This process is however well known and thus it is not necessary to describe it here in detail.

Previous research into fluidic oscillators found serious problems in detecting very small pressure pulses at low frequencies of oscillation. A low differential pressure transducer may be used with the present invention since the signal obtained requires minimum signal conditioning. A filtering system may be used with the pressure transducer to reduce noise and boost the signal.

FIG. 5 shows a graph of frequency of oscillation, f (Hz), against rate of flow, Q (m³/hour), for an example of a flowmeter according to the invention. It can be seen that for this meter over this range, oscillation frequency is proportional to rate of flow. The fluid used was air, although the invention can also be used for metering flow of other fluids.

We claim:

1. A flowmeter including a fluidic oscillator wherein the oscillator comprises:
   (a) an inlet nozzle by which fluid the flow of which is to be measured enters the oscillator;
   (b) an exit by which fluid leaves the oscillator;
   (c) first walls joining the inlet nozzle and exit forming opposing sides of the meter and defining an axially symmetric interaction region through which the flow first passes and an axially symmetric outlet region downstream of the interaction region;
   (d) diverging, parallel sided narrow side walls disposed in the interaction region symmetrically on opposing sides of the axis of symmetry of the interaction region to define respective feedback channels and an interaction chamber therebetween, the feedback channels each having an exit disposed adjacent said inlet nozzle to form a control port of the interaction chamber and an entrance disposed downstream of the respective exit;
   (e) downstream corners of the entrances to said feedback channels being defined by the conjunction of adjacent portions of said first walls wherein the angle between adjacent portions at each said corner is less than 90°;
(f) a splitter located along the axis of symmetry of said outlet region and protruding into said interaction region;
(g) a splitter face formed at one end of said splitter opposing said inlet nozzle on the axis of symmetry of the interaction region and having generally sharp corners to promote, in use, separation of flow incident thereon to one side or other of said splitter, wherein the splitter face is located so that at least part of each feedback channel entrance lies upstream thereof and each downstream feedback channel entrance corner lies downstream thereof such that in use oscillating flow develops across the splitter face and each downstream feedback channel entrance corner intercepts the parts of the oscillating flow separating from the respective corner of said splitter face to promote flow of fluid, lying between on the one hand the respective side wall and on the other hand directed to the splitter face, into the respective feedback channel.

2. A flowmeter according to claim 1 in which the entrances to the feedback channels are at an angle greater than 90° to the side walls.

3. A flowmeter according to claim 1 in which the splitter is bluff-ended.

4. A flowmeter according to claim 1 in which the ratio of the width w of the splitter to the width b of the inlet nozzle lies in the range from 0.4 to 1.2 inclusive.

5. A flowmeter according to claim 1 in which the ratio of the perpendicular distance u from the centre line of the meter to the downstream corner of the feedback channel entrance to the splitter width w lies in the range from 2 to 8 inclusive.

6. A flowmeter according to claim 1 in which the ratio of the distance v from the front face of the splitter to the downstream corner of the feedback channel entrance to the perpendicular distance u from the centre line of the meter to the downstream corner of the feedback channel entrance lies in the range from 0.4 to 1.3 inclusive.

7. A flowmeter according to claim 6 in which v/u lies in the range from 0.7 to 1.3 inclusive.

8. A flowmeter according to claim 1 which has restrictions in the outlet paths downstream of the feedback channels, the ratio of the width g of the restrictions to the inlet nozzle width b being in the range 0.5 to 1.5 inclusive.

9. A flowmeter according to claim 1 in which the ratio of the distance z from the nozzle to the splitter to the inlet nozzle width b lies in the range from 5 to 9 inclusive.

10. A flowmeter according to claim 1 in which the ratio of the width f of the feedback passages to the inlet nozzle width b lies in the range from 0.9 to 4 inclusive.

11. A flowmeter according to claim 10 in which f/b lies in the range from 2 to 4 inclusive.

12. A flowmeter according to claim 1 in which the ratio of the control port width c to the inlet nozzle width b lies in the range from 0.7 to 2.5 inclusive.

13. A flowmeter according to claim 12 in which c/b lies in the range from 0.7 to 2 inclusive.

14. A flowmeter according to claim 1 in which the ratio of the feedback channel entrance width e to the inlet nozzle width b lies in the range from 2 to 5 inclusive.

15. A flowmeter according to claim 1 in which the ratio of the length l of the side walls to the inlet nozzle width b lies in the range from 3 to 6.

16. A flowmeter according to claim 1 wherein each side wall has a first surface bounding said chamber and a second surface parallel to said first surface bounding the feedback channel.

17. A flowmeter including a fluidic oscillator said oscillator comprising:
an axially symmetric chamber;
an inlet nozzle communicating with said chamber for introducing a jet of fluid, the flow of which is to be measured, thereinto;
side walls diverging in the direction of flow of said jet and defining said chamber;
feedback channel entrances each lying downstream of a respective side wall;
feedback channel exits each lying upstream of a respective side wall adjacent said inlet nozzle to define control ports of said chamber to promote oscillation of said jet to one side or other of the axis of symmetry of said chamber;
feedback channels each extending between a respective feedback channel entrance and a respective feedback channel exit;
a splitter lying along said axis of symmetry to define outlet paths leading from said chamber;
a splitter face opposing said inlet nozzle on said axis of symmetry, having generally sharp edges to promote separation of the flow of said fluid therefrom and being positioned downstream of said side walls and upstream of the downstream edges of the feedback channel entrances;
wherein the relative dimensions and positioning of the inlet nozzle, the splitter face and the downstream edges of the feedback channel entrances are such that in use an oscillating flow is developed across the splitter face to separate alternately from one or the other edge of the splitter face and is directed to be incident on the respective downstream feedback channel edge whereby to direct flow of said jet, lying between the separated flow and the respective side wall, into the respective feedback channel.

18. A flowmeter including a fluidic oscillator wherein the oscillator comprises:
(a) an inlet nozzle by which fluid the flow of which is to be measured enters the oscillator;
(b) an exit by which fluid leaves the oscillator;
(c) first walls joining the inlet nozzle and exit forming opposing sides of the meter and defining an axially symmetric interaction region through which the flow first passes and an axially symmetric outlet region downstream of the interaction region;
(d) diverging, parallel sided narrow side walls disposed in the interaction region symmetrically on opposing sides of the axis of symmetry of the interaction region to define respective feedback channels and an interaction chamber therebetween, the feedback channels each having an exit disposed adjacent said inlet nozzle to form a control port of the interaction chamber and an entrance disposed downstream of the respective exit;
(e) downstream corners of the entrances to said feedback channels being defined by the conjunction of adjacent portions of said first walls wherein the angle between adjacent portions at each said corner is less than 90°;

(f) a splitter located along the axis of symmetry of said outlet region and protruding into said interaction region;

(g) a splitter face formed at one end of said splitter opposing said inlet nozzle on the axis of symmetry of the interaction region and having generally sharp corners to promote, in use, separation of flow incident thereon to one side or other of said splitter, wherein the splitter face is located so that at least part of each feedback channel entrance lies upstream thereof and each downstream feedback channel entrance corner lies downstream thereof such that in use oscillating flow develops across the splitter face and each downstream feedback channel entrance corner intercepts the parts of the oscillating flow separating from the respective corner of said splitter face to promote flow of fluid, lying between on the one hand the respective side wall and on the other hand directed to the splitter face, into the respective feedback channel, the arrangement being such that the ratio of the perpendicular distance u from the centre line of the meter to the downstream corner of the feedback channel entrace to the splitter width w is 4.71.

19. A flowmeter including a fluidic oscillator wherein the oscillator comprises:
    (a) an inlet nozzle by which fluid the flow of which is to be measured enters the oscillator;
    (b) An exit by which fluid leaves the oscillator;
    (c) first walls joining the inlet nozzle and exit forming opposing sides of the meter and defining an axially symmetric interaction region through which the flow first passes and an axially symmetric outlet region downstream of the interaction region;
    (d) diverging, parallel sided narrow side walls disposed in the interaction region symmetrically on opposing sides of the axis of symmetry of the interaction region to define respective feedback channels and an interaction chamber therebetween, the feedback channels each having an exit disposed adjacent said inlet nozzle to form a control port of the interaction chamber and an entrance disposed downstream of the respective exit;
    (e) downstream corners of the entrances to said feedback channels being defined by the conjunction of adjacent portions of said first walls wherein the angle between adjacent portions at each said corner is less than 90°;
    (f) a splitter located along the axis of symmetry of said outlet region and protruding into said interaction region;
    (g) a splitter face formed at one end of said splitter opposing said inlet nozzle on the axis of symmetry of the interaction region and having generally sharp corners to promote, in use, separation of flow incident thereon to one side or other of said splitter, wherein the splitter face is located so that at least part of each feedback channel entrance lies upstream thereof and each downstream feedback channel entrance corner lies downstream thereof such that in use oscillating flow develops across the splitter face and each downstream feedback channel entrance corner intercepts the parts of the oscillating flow separating from the respective corner of said splitter face to promote flow of fluid, lying between on the one hand the respective side wall and on the other hand directed to the splitter face, into the respective feedback channel, the arrangement being such that the ratio of the distance v from the front face of the splitter to the downstream corner of the feedback channel entrance to the perpendicular distance u from the centre line of the meter to the downstream corner of the feedback channel entrance lies in the range from 0.4 to 1.3 inclusive.

20. A flowmeter including a fluidic oscillator wherein the oscillator comprises:
    (a) an inlet nozzle by which fluid the flow of which is to be measured enters the oscillator;
    (b) an exit by which fluid leaves the oscillator;
    (c) first walls joining the inlet nozzle and exit forming opposing sides of the meter and defining an axially symmetric interaction region through which the flow first passes and an axially symmetric outlet region downstream of the interaction region;
    (d) diverging, parallel sided narrow side walls disposed in the interaction region symmetrically on opposing sides of the axis of symmetry of the interaction region to define respective feedback channels and an interaction chamber therebetween, the feedback channels each having an exit disposed adjacent said inlet nozzle to form a control port of the interaction chamber and an entrance disposed downstream of the respective exit;
    (e) downstream corners of the entrances to said feedback channels being defined by the conjunction of adjacent portions of said first walls wherein the angle between adjacent portions at each said corner is less than 90°;
    (f) a splitter located along the axis of symmetry of said outlet region and protruding into said interaction region;
    (g) a splitter face formed at one end of said splitter opposing said inlet nozzle on the axis of symmetry of the interaction region and having generally sharp corners to promote, in use, separation of flow incident thereon to one side or other of said splitter, wherein the splitter face is located so that at least part of each feedback channel entrance lies upstream thereof and each downstream feedback channel entrance corner lies downstream thereof such that in use oscillating flow develops across the splitter face and each downstream feedback channel entrance corner intercepts the parts of the oscillating flow separating from the respective corner of said splitter face to promote flow of fluid, lying between on the one hand the respective side wall and on the other hand directed to the splitter face, into the respective feedback channel, the arrangement being such that the ratio of the distance z from the nozzle to the splitter to the inlet nozzle width b is 6.25.

21. A flowmeter including a fluidic oscillator wherein the oscillator comprises:
    (a) an inlet nozzle by which fluid the flow of which is to be measured enters the oscillator;
    (b) an exit by which fluid leaves the oscillator;
    (c) first walls joining the inlet nozzle and exit forming opposing sides of the meter and defining an axially symmetric interaction region through which the flow first passes and an axially symmetric outlet region downstream of the interaction region;
    (d) diverging, parallel sided narrow side walls disposed in the interaction region symmetrically on opposing sides of the axis of symmetry of the interaction region to define respective feedback channels and an interaction chamber therebetween, the feedback channels each having an exit disposed adjacent said inlet nozzle to form a control port of the interaction chamber and an entrance disposed downstream of the respective exit;

(e) downstream corners of the entrances to said feedback channels being defined by the conjunction of adjacent portions of said first walls wherein the angle between adjacent portions at each said corner is less than 90°;

(f) a splitter located along the axis of symmetry of said outlet region and protruding into said interaction region;

(g) a splitter face formed at one end of said splitter opposing said inlet nozzle on the axis of symmetry of the interaction region and having generally sharp corners to promote, in use, separation of flow incident thereon to one side or other of said splitter, wherein the splitter face is located so that at least part of each feedback channel entrance lies upstream thereof and each downstream feedback channel entrance corner lies downstream thereof such that in use oscillating flow develops across the splitter face and each downstream feedback channel entrance corner intercepts the parts of the oscillating flow separating from the respective corner of said splitter face to promote flow of fluid, lying between on the one hand the respective side wall and on the other hand directed to the splitter face, into the respective feedback channel, the arrangement being such that the ratio of the length 1 of the side walls to the inlet nozzle width b is 4.

22. A flowmeter including a fluidic oscillator wherein the oscillator comprises:

(a) an inlet nozzle by which fluid the flow of which is to be measured enters the oscillator;

(b) an exit by which fluid leaves the oscillator;

(c) first walls joining the inlet nozzle and exit forming opposing sides of the meter and defining an axially symmetric interaction region through which the flow first passes and an axially symmetric outlet region downstream of the interaction region;

(d) diverging, parallel sided narrow side walls disposed in the interaction region symmetrically on opposing sides of the axis of symmetry of the interaction region to define respective feedback channels and an interaction chamber therebetween, the feedback channels each having an exit disposed adjacent said inlet nozzle to form a control port of the interaction chamber and an entrance disposed downstream of the respective exit;

(e) downstream corners of the entrances to said feedback channels being defined by the conjunction of adjacent portions of said first walls wherein the angle between adjacent portions at each said corner is less than 90°;

(f) a splitter located along the axis of symmetry of said outlet region and protruding into said interaction region;

(g) a splitter face formed at one end of said splitter opposing said inlet nozzle on the axis of symmetry of the interaction region and having generally sharp corners to promote, in use, separation of flow incident thereon to one side or other of said splitter, wherein the splitter face is locared so that at least part of each feedback channel entrance lies upstream thereof and each downstream feedback channel entrance corner lies downstream thereof such that in use oscillating flow develops across the splitter face and each downstream feedback channel entrance corner intercepts the parts of the oscillating flow separating from the respective corner of said splitter face to promote flow of fluid, lying between on the one hand to the respective side wall and on the other hand directed to the splitter face, into the respective feedback channel, the arrangement being such that the ratio of the feedback channel entrance width e to the inlet nozzle width b is 3.13.

23. A flowmeter including a fluidic oscillator wherein the oscillator comprises:

(a) an inlet nozzle by which fluid the flow of which is to be measured enters the oscillator;

(b) an exit by which fluid leaves the oscillator;

(c) first walls joining the inlet nozzle and exit forming opposing sides of the meter and defining an axially symmetric interaction region through which the flow first passes and an axially symmetric outlet region downstream of the interaction region;

(d) diverging, parallel sided narrow side walls disposed in the interaction region symmetrically on opposing sides of the axis of symmetry of the interaction region to define respective feedback channels and an interaction chamber therebetween, the feedback channels each having an exit disposed adjacent said inlet nozzle to form a control port of the interaction chamber and an entrance disposed downstream of the respective exit;

(e) downstream corners of the entrances to said feedback channels being defined by the conjunction of adjacent portions of said first walls wherein the angle between adjacent portions at each said corner is less than 90°;

(f) a splitter located along the axis of symmetry of said outlet region and protruding into said interaction region;

(g) a splitter face formed at one end of said splitter opposing said inlet nozzle on the axis of symmetry of the interaction region and having generally sharp corners to promote, in use, separation of flow incident thereon to one side or other of said splitter, wherein the splitter face is located so that at least part of each feedback channel entrance lies upstream thereof and each downstream feedback channel entrance corner lies downstream thereof such that in use oscillating flow develops across the splitter face and each downstream feedback channel entrance corner intercepts the parts of the oscillating flow separating from the respective corner of said splitter face to promote flow of fluid, lying between on the one hand the respective side wall and on the other hand directed to the splitter face, into the respective feedback channel, the arrangement being such that the ratio of the control port width c to the inlet nozzle width b lies in the range 0.7 to 2 inclusive.

* * * * *